United States Patent
Naoe

(10) Patent No.: US 6,827,968 B2
(45) Date of Patent: Dec. 7, 2004

(54) PROCESS FOR PRODUCING MAGNETIC RECORDING MEDIUM

(75) Inventor: Koji Naoe, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/601,559

(22) Filed: Jun. 24, 2003

(65) Prior Publication Data

US 2003/0235650 A1 Dec. 25, 2003

(30) Foreign Application Priority Data

Jun. 24, 2002 (JP) ........................................ 2002-182548

(51) Int. Cl.$^7$ ................................................. B05D 5/12
(52) U.S. Cl. ....................... 427/122; 427/131; 427/132; 428/900
(58) Field of Search ................................ 427/131, 132, 427/122; 428/900

(56) References Cited

FOREIGN PATENT DOCUMENTS

| JP | 63-187418 A | 8/1988 |
|----|-------------|--------|
| JP | 63-191315 A | 8/1988 |

*Primary Examiner*—Bernard Pianalto
(74) *Attorney, Agent, or Firm*—Sughrue Mion, PLLC

(57) ABSTRACT

A process for producing a magnetic recording medium is provided, the medium being formed from a non-magnetic flexible support, a non-magnetic layer comprising a non-magnetic powder and a binder, and a magnetic layer comprising a ferromagnetic powder and a binder. The non-magnetic layer is provided on top of the support, the magnetic layer is provided on top of the non-magnetic layer, and the non-magnetic powder includes two or more types of non-magnetic powder, including carbon black and a non-magnetic powder other than carbon black. The process includes a step of separately dispersing a non-magnetic liquid A that includes a binder and a non-magnetic powder other than carbon black, and a non-magnetic liquid B that includes carbon black and a binder, and a step of stirring and mixing the non-magnetic liquid A and the non-magnetic liquid B to prepare a non-magnetic coating solution.

20 Claims, No Drawings

US 6,827,968 B2

PROCESS FOR PRODUCING MAGNETIC RECORDING MEDIUM

BACKGROUND OF THE INVENTION

1. Field of the Invention

The present invention relates to a process for producing a magnetic recording medium and, in particular, a process for producing a high density magnetic recording medium with excellent productivity.

2. Description of the Related Art

A recent trend in magnetic recording media has been for the recording density to increase and the recording wavelength to shorten. With regard to the magnetic recording media, there is a high demand for reducing the spacing loss by leveling the surface of a magnetic layer. As one method for leveling the surface of the magnetic layer, there is a method disclosed in JP-A-63-191315 (JP-A denotes a Japanese unexamined patent application publication) and JP-A-63-187418 in which a non-magnetic layer as a lower layer and a thin layer as an upper layer are applied by a simultaneous double layer coating method. As a method for further leveling the surface in this layer structure, there is a method in which an acicular powder is used as a lower layer non-magnetic powder, and a method in which titanium oxide, $\alpha$-iron oxide, etc. is used as a main powder, and fine particles of carbon black are used as a secondary powder, thus adjusting the liquid viscosity and thereby suppressing interfacial disturbance during double layering.

Furthermore, there is a method in which voids are maintained during formation of a coating by reducing the amount of binder in the lower non-magnetic layer, thus improving the calendering performance during a calendering treatment and thereby leveling the surface.

However, when non-magnetic liquids used in these methods are subjected to a high dispersion treatment by means of a sand mill, etc. using a high specific gravity dispersing medium (zirconia beads, etc.), the liquid viscosity tends to increase during the dispersion treatment or during storage after the dispersion treatment. This causes the problems of it becoming impossible for the liquid to be fed during the dispersion treatment and it being necessary to disassemble pipes for cleaning when halting the dispersion treatment, thus greatly decreasing the productivity due to the liquid loss and the increased operational load.

BRIEF SUMMARY OF THE INVENTION

An object of the present invention is to provide a high productivity process for producing a high density magnetic recording medium and, more particularly, to provide a process for producing a magnetic recording medium in which increased density and productivity can be achieved at the same time, and smoothness of the surface of a magnetic layer and suppression of the viscosity of a non-magnetic liquid can be achieved at the same time.

As a result of an intensive investigation by the present inventors into a process for producing a non-magnetic coating solution in order to achieve the above-mentioned object, a high productivity process for producing a magnetic recording medium has been accomplished by the production process described below, in which the surface of a magnetic layer of the magnetic recording medium is smooth, the medium exhibits good electromagnetic conversion characteristics, the low shear viscosity of the non-magnetic liquid is low, and the liquid loss is small.

That is, the present invention provides a process for producing a magnetic recording medium comprising a non-magnetic flexible support, a non-magnetic layer comprising a non-magnetic powder and a binder, and a magnetic layer comprising a ferromagnetic powder and a binder, the non-magnetic layer being provided on top of the support, the magnetic layer being provided on top of the non-magnetic layer, and the non-magnetic powder comprising two or more types of non-magnetic powder including carbon black and a non-magnetic powder other than carbon black, the process comprising a step of separately dispersing a non-magnetic liquid A and a non-magnetic liquid B, the non-magnetic liquid A comprising a binder and a non-magnetic powder other than carbon black and the non-magnetic liquid B comprising carbon black and a binder, and a subsequent step of stirring and mixing the non-magnetic liquid A and the non-magnetic liquid B to prepare a non-magnetic coating solution.

DETAILED DESCRIPTION OF THE INVENTION

The non-magnetic powder used in the production process of the present invention comprises two or more types of non-magnetic powder, including carbon black and a non-magnetic powder other than carbon black. The essential steps of the production process of the present invention include a step of separately dispersing a non-magnetic liquid A comprising a binder and a non-magnetic powder other than carbon black, and a non-magnetic liquid B comprising carbon black and a binder, and a subsequent step of stirring and mixing the non-magnetic liquid A and the non-magnetic liquid B to prepare a non-magnetic coating solution. Dispersing the non-magnetic liquid A and the non-magnetic liquid B separately can suppress the viscosity and the liquid loss of the non-magnetic liquids.

In the present invention, when the non-magnetic liquid A and the non-magnetic liquid B are stirred and mixed continuously without being kept stationary after they are separately dispersed, the two non-magnetic liquids can be uniformly mixed by stirring and mixing at a peripheral speed of 3 m/sec or higher.

On the other hand, when there is a period of 1 min or more between the time when dispersion of the non-magnetic liquid B is completed and the time when stirring and mixing of the non-magnetic liquid A and the non-magnetic liquid B is started, since the carbon black in the non-magnetic liquid B reaggregates to a large extent, it is difficult to break apart the aggregated carbon black by stirring and mixing at a peripheral speed of 18 m/sec or less, and the two non-magnetic liquids cannot be mixed uniformly. This causes the problems of D.O. and errors, due to spacing loss resulting from the surface roughness and the aggregates.

In order to break apart the aggregated carbon black, in the present invention it is preferable to mix and stir the non-magnetic liquids A and B at a peripheral speed of at least 25 m/s. Stirring and mixing at a peripheral speed of at least 25 m/s is effective when there is a period of 1 min or more between the time when dispersion of the non-magnetic liquid B is completed and the time when stirring and mixing of the non-magnetic liquid A and the non-magnetic liquid B is started.

In the present invention, it is preferable to use, as a high speed stirring machine, a thin-film spin system high speed mixer disclosed in JP-A-9-75698, JP-A-11-347388 (Japanese registered patent No. 3256801), and T. Asa, '21 Seiki no Kakuhangijutsu (Stirring technology in the 21st century)' (Published by Kogyo Chosakai Publishing Co., Ltd on 20 Nov. 2000). It is generally known that in a conventional high speed stirring machine, cavitation occurs at a peripheral speed of 20 m/s or more and a shearing force cannot be applied to the liquid. Use of the thin-film spin system high speed mixer enables high speed stirring to be carried out at a peripheral speed of 25 m/s or more.

The thin-film spin system high speed mixer preferably used in the present invention is a stirring device having a container, a rotating shaft provided in the center of the container, and one or more stirrers mounted on the rotating shaft, the container having a circular cross section and being capable of containing a liquid that is to be treated by stirring. The stirrer has a radius that reaches the vicinity of the inner peripheral surface of the container, and the machine further includes a drive source for driving the stirrer at a high speed of at least 20 m/sec. By rotating the liquid being treated in response to the rotation of the stirrer, the liquid being treated is pressed against the inner surface of the container by centrifugal force and is rotated in a hollow thin film state. There can be one or plural stirrers according to the size of the container, but providing a plurality thereof enables the liquid being treated to be dispersed uniformly.

Specific examples of the thin-film spin system high speed mixer include the T. K. Filmics model 80-50 manufactured by Tokushu Kika Kogyo Co., Ltd. In the T. K. Filmics, since the stirring vessel is small and the liquid being treated is pressed against the circumferential surface of the stirring vessel by centrifugal force, as explained by the inventors, Asa, et al., the energy transfer site is small and a high energy can be transferred to the liquid being treated in a short time. The present inventors have found that uniform mixing can be achieved in a short time by stirring at a high peripheral speed using the T. K. Filmics as the high-speed stirring machine.

Stirring and mixing can be carried out batchwise or continuously.

As one mode of carrying out batchwise stirring and mixing in the production process of the present invention, the non-magnetic liquid A and the non-magnetic liquid B can be stirred and mixed under the conditions below. A T. K. Filmics model 80-50 (cylinder inner diameter: 80 mm, capacity: 370 cc) manufactured by Tokushu Kika Kogyo Co., Ltd. is used as a stirring device with, as a stirrer blade, a $\phi$76 mm PC (Perforated Cylinder) wheel having a large number of $\phi$5 mm small through holes on the cylinder body in a radial direction; the non-magnetic liquid A and the non-magnetic liquid B are mixed batchwise to give 250 ml of a mixture, and the mixture is then stirred at a high speed.

High speed stirring is carried out by repeating 20 cycles of: (1) increasing the speed to a peripheral speed of 50 m/sec over 10 sec from the start, then holding the peripheral speed of 50 m/sec for 3 sec, and then reducing the speed over 10 sec to a temporary stop, and (2) cooling the liquid being treated by low speed stirring at a peripheral speed of 5 m/sec for 30 sec while passing cooling water (chiller water at 7° C.) at a flow rate of 35 L/min through the stirring vessel, so as to make a total time of high speed stirring of 1 min. In the case of stirring and mixing at 25 m/sec, the time over which the speed is increased and decreased is 5 sec.

As one mode of carrying out continuous stirring and mixing, the non-magnetic liquid A and the non-magnetic liquid B that are to be treated can be fed continuously to, for example, the T. K. Filmics model 80-50, and stirred and mixed. High speed stirring may be carried out by repeating, as in the batchwise treatment: (1) increasing the stirring speed and then holding a high rotational speed, (2) reducing the speed and holding a low rotational speed, and stopping as necessary.

In this stage, when the residence time (retention time of the non-magnetic liquid A and the non-magnetic liquid B in the stirring/mixing device=inner volume of the stirring/mixing device/(feed rate of the non-magnetic liquid A and the non-magnetic liquid B)) is t1 and the time during which they are subjected to high speed stirring treatment (holding time) is t2, the holding time is preferably 0 to 30 sec. The ratio t1/t2 is preferably at least 1, and more preferably at least 10. The upper limit for the ratio t1/t2 can be determined by the manner in which particles are broken apart, the time taken for broken apart particles to re-aggregate, etc., but it is at most 1,000, and preferably at most 500.

A preferred embodiment of the thin-film spin system high speed mixer is as follows. The stirrer blade is preferably a PC wheel. The proportion of the total area of small holes relative to the cylinder area, that is, the aperture ratio, is preferably at least 30%, and more preferably at least 50%. The small holes may be circular, square, rectangular, or diamond-shaped. The small holes are preferably present uniformly. In mixing using the thin-film spin system high speed mixer, the liquid being treated is pressed against a cylinder inner wall of the stirring vessel by the centrifugal force generated by stirring, thus forming a thin film (about 12 to 18 mm). When this thin film comes into contact with the cylinder inner wall, a circulating flow is formed due to upper and lower spinning flows. The stirrer blade is designed so as to intersect the thin film, thereby making the spinning flow of the liquid being treated pass through the large number of holes of the PC wheel stirrer blade and repeatedly collide with the cylinder inner wall of the stirring vessel many times. These collisions with the cylinder inner wall cause the aggregated particles to break apart, thus reducing the cluster size, whereas the broken apart particles tumbling on the cylinder inner wall surface due to the spinning flows are granulated by tumbling. This mechanism allows the mixture containing the two types of particles and the binder to achieve uniform mixing by repeated breaking apart of aggregates and granulation.

From the viewpoint of the above-mentioned mechanism, it is preferable to increase the speed to a high peripheral speed in a short time in the treatment pattern using the thin-film spin system high speed mixer. Increasing the centrifugal force can enhance the breaking apart force during collision with the cylinder inner wall of the stirring vessel.

Furthermore, after a constant peripheral speed is obtained, it is preferable for the time for which it is held to be short. The time for which it is held in the present invention is preferably 0 to 30 sec, and more preferably 0 to 10 sec. Reducing the time for which it is held can suppress the tumbling granulation and an increase in the liquid temperature of the liquid being treated. It is surmised that the increase in liquid temperature of the liquid being treated is due to heat generated by sliding against the inner wall of the stirring vessel and shearing by the stirrer blade. There might be a problem of the flowability decreasing due to evaporation of the solvent caused by the increase in liquid temperature of the liquid being treated or due to an increase in the viscosity caused by the solvent being encapsulated during the tumbling granulation. When mixing using the thin-film spin system high speed mixer, if the flowability of the liquid decreases, then the ability to break apart particles deteriorates.

In view of the above-mentioned points, in the treatment pattern using the thin-film spin system high speed mixer, it is preferable, from the viewpoint of increasing the collision force with the cylinder inner wall of the stirrer vessel and increasing the number of times of collision, to repeat intermittently, for brief periods, the increasing of the speed to a high peripheral speed and the holding of the speed, and this pattern is suitable for breaking apart aggregated carbon black in the present invention.

Moreover, it is preferable to maintain the flowability by keeping the liquid being treated at high temperature without passing cooling water through the stirring vessel during high speed stirring as long as the temperature does not exceed the boiling point of the solvent. After high speed stirring, the dispersion stability can be enhanced by cooling the liquid being treated by low speed stirring while passing cooling water through the stirring vessel.

In the case where the T. K. Filmics is used, although the temperature of the liquid increases as the speed increases, by setting Tg of the binder so that $$Tg-50(° C.)<tk<Tg+30(° C.)$$

where tk denotes the temperature of the liquid being treated when the speed reaches a constant peripheral speed, adsorption of the particles with the binder solution during high speed stirring can be enhanced. Furthermore, it is possible to suppress adsorption of the particles with the binder solution at a time immediately after starting stirring when the aggregated particles are not yet broken apart.

The non-magnetic powder used in the present invention preferably has a different specific gravity from that of the solvent of the liquid being treated. More preferably, $$hf>hy, hf-hy \geq 0.5(g/cc)$$

is satisfied, where hy denotes the specific gravity of the solvent of the liquid being treated, and hf denotes the specific gravity of the non-magnetic powder. The larger the specific gravity of the powder relative to that of the solvent, the higher the impact force on the cylinder inner wall of the stirring vessel due to the centrifugal force.

In the present invention, it is preferable to enhance the dispersion and the dispersion stability of the carbon black in the non-magnetic liquid B prior to mixing and stirring the non-magnetic liquid A and the non-magnetic liquid B. Specifically, by employing sand mill dispersion and ultrasonic dispersion in combination for dispersion of the non-magnetic liquid B, the dispersion and the dispersion stability can be enhanced.

In the present invention, the dispersion treatment can be carried out using a horizontal circulating type pin type sand mill disperser (2 L type) with small-diameter zirconia beads (0.5 mmφ) packed at a bead packing ratio of 80% at a pin tip peripheral speed of 12 m/sec, a flow rate of 0.5 kg/min, and a dispersion residence time of 60 min. The non-magnetic liquid A is also preferably dispersed under the same dispersion conditions as above except that the dispersion residence time is 30 min.

Furthermore, the non-magnetic liquid B is preferably subjected to a flow type ultrasonic homogenizer (model US-1200 CVP manufactured by Nippon Seiki Co., Ltd., frequency: 20 KHz, irradiation area: 50 mmφ, amplitude: 30 μm, distance between the irradiation area and the holder: 3 mm) at a circulation flow rate of 300 g/min with three passes, and this treatment can break down the micron-size aggregated carbon black, thereby improving the dispersion stability.

Magnetic Layer

In the present invention, a non-magnetic layer (hereinafter, also called a 'lower layer') and a magnetic layer (hereinafter, also called an 'upper layer' or an 'upper magnetic layer') are provided on both sides or one side of a support. The upper and lower layers can be provided by applying the lower layer, and then providing the upper magnetic layer either while the lower layer is in a wet state (Wet on Wet) or after it has been dried (Wet on Dry).

Ferromagnetic Metal Powder

With regard to a ferromagnetic metal powder used in the present invention, a ferromagnetic alloy powder having α-Fe as a main component is preferable. These ferromagnetic powders may contain, apart from the designated atom, atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, Sm, P, Co, Mn, Zn, Ni, Sr and B. In particular, it is preferable for the powder to contain, in addition to α-Fe, at least one selected from Al, Si, Ca, Y, Ba, La, Nd, Sm, Co, Ni and B, and more preferably at least one of Co, Y, Al, Nd and Sm. The Co content is preferably 0 to 40 atom % relative to Fe, more preferably 5 to 35 atom %, and yet more preferably 10 to 35 atom %. The Y content is preferably 1.5 to 12 atom %, more preferably 3 to 10 atom %, and yet more preferably 3 to 9 atom %. The Al content is preferably 1.5 to 13 atom %, more preferably 3 to 11 atom %, and yet more preferably 4 to 10 atom %. These ferromagnetic powders may be treated in advance, prior to dispersion, with a dispersant, a lubricant, a surfactant, an antistatic agent, etc. Details are described in JP-B-44-14090 (JP-B denotes a Japanese examined patent application publication), JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, U.S. Pat. Nos. 3,026,215, 3,031,341, 3,100, 194, 3,242,005, and 3,389,014, etc.

The ferromagnetic metal powder may contain a small amount of a hydroxide or an oxide. The ferromagnetic metal powder can be obtained by a known production method, which can be exemplified by the following methods. There are a method involving reduction of a composite organic acid salt (mainly an oxalate) with a reducing gas such as hydrogen, a method in which iron oxide is reduced with a reducing gas such as hydrogen to give Fe or Fe—Co particles, a method involving thermolysis of a metal carbonyl compound, a method involving reduction by the addition of a reducing agent such as sodium borohydride, a hypophosphite, or hydrazine to an aqueous solution of a ferromagnetic metal, a method in which a fine powder is obtained by vaporizing a metal in a low pressure inert gas, etc. The ferromagnetic metal powder thus obtained can be subjected to a known slow oxidation process, that is to say, it can be treated by any one of a method in which it is immersed in an organic solvent and then dried, a method in which after it is immersed in an organic solvent an oxygen-containing gas is fed in so as to form an oxidized film on the surface and it is then dried, and a method in which an oxidized film is formed on the surface by adjusting the partial pressures of oxygen gas and an inert gas without using an organic solvent.

The BET specific surface area of the ferromagnetic metal powder used in the magnetic layer of the present invention is 45 to 80 m²/g, and preferably 50 to 70 m²/g. When it is less than 45 m²/g, the noise increases, and when it exceeds 80 m²/g, it becomes difficult to obtain surface smoothness, which is undesirable. The crystallite size of the ferromagnetic metal powder used in the magnetic layer of the present invention is 80 to 180 Å, preferably 100 to 180 Å, and more preferably 110 to 175 Å. The average length of the major axis of the ferromagnetic metal powder is preferably 30 to 150 nm, and more preferably 30 to 100 nm. The acicular ratio of the ferromagnetic metal powder is preferably 3 to 15, and more preferably 5 to 12. The Hc of the ferromagnetic metal powder is usually 155 to 239 kA/m (1950 to 3000 Oe), and preferably 159 to 223 kA/m (2000 to 2800 Oe). The saturation magnetization ($\sigma_s$) of the ferromagnetic metal powder is 100 to 200 A·m$^2$/kg (100 to 200 emu/g), and preferably 120 to 180 A·m$^2$/kg (120 to 180 emu/g).

The water content of the ferromagnetic metal powder is preferably set at 0.01 to 2 wt %. The water content of the ferromagnetic metal powder is preferably optimized according to the type of binder. The pH of the ferromagnetic metal powder is preferably optimized according to the binder used in combination therewith. The pH is usually in the range of 4 to 12, and preferably from 6 to 10. The ferromagnetic metal powder may be subjected to a surface treatment with Al, Si, P, or an oxide thereof, if necessary. The amount thereof is usually 0.1 to 10 wt % relative to the ferromagnetic metal powder, and the surface treatment can suppress adsorption of a lubricant such as a fatty acid to 100 mg/m$^2$ or below, which is preferable. The ferromagnetic metal powder might contain soluble inorganic ions such as Na, Ca, Fe, Ni or Sr ions in some cases. It is preferable for them to be substantially absent, but their presence at 200 ppm or below does not particularly affect the characteristics. The ferromagnetic metal powder used in the present invention preferably has few pores, and the level thereof is 20 vol % or below, and more preferably 5 vol % or below. The form of the ferromagnetic metal powder may be any of acicular, rice-grain shaped and spindle-shaped as long as the characteristics of the particle size described above are satisfied. The SFD (switching field distribution) of the ferromagnetic metal powder itself is preferably low, and 0.8 or below is preferred. It is also necessary to narrow the Hc distribution of the ferromagnetic metal powder. When the SFD is 0.8 or below, the electromagnetic conversion characteristics become good, the output becomes high, the magnetization reversal becomes sharp with a suppressed peak shift, and it is suitable for high-recording-density digital magnetic recording. The Hc distribution of the ferromagnetic metal powder can be narrowed by improving a goethite particle size distribution, preventing sintering, etc.

Non-magnetic Layer

Next, the lower layer is explained in detail. The lower layer of the present invention comprises at least a binder and two or more types of non-magnetic powders, including carbon black and a non-magnetic powder other than carbon black. Examples of the non-magnetic powder other than carbon black include an inorganic powder and an organic powder. The inorganic powder is usually preferably a non-magnetic powder, but a magnetic powder may be mixed therewith in a range that does not substantially affect the electromagnetic conversion characteristics.

Non-magnetic Powder

Examples of the non-magnetic powder other than carbon black include inorganic compounds such as a metal oxide, a metal carbonate, a metal sulfate, a metal nitride, a metal carbide and a metal sulfide. As the inorganic compound, α-alumina with an α-component proportion of at least 90%, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. can be used singly or in combination. Particularly preferable in terms of a narrow particle size distribution, the possibility of having many means for imparting functionality, etc., are titanium dioxide, zinc oxide, α-iron oxide and barium sulfate, and more preferable are titanium dioxide and α-iron oxide. The average particle size of such a non-magnetic powder is preferably 0.005 to 2 μm, but it is also possible, as necessary, to combine non-magnetic powders having different particle sizes or widen the particle size distribution of a single non-magnetic powder, thus producing the same effect. The average particle size of the non-magnetic powder is particularly preferably 0.01 to 0.2 μm. In particular, when the non-magnetic powder is a grain-shaped metal oxide, the average particle size is preferably 0.08 μm or below. When it is an acicular metal oxide, the average length of the major axis is preferably 0.01 to 0.3 μm, and more preferably 0.01 to 0.2 μm. The tap density is 0.05 to 2 g/ml, and preferably 0.2 to 1.5 g/ml. The water content of the non-magnetic powder is 0.1 to 5 wt %, preferably 0.2 to 3 wt %, and more preferably 0.3 to 1.5 wt %. The pH of the non-magnetic powder is usually 2 to 11, and particularly preferably in the range of 3 to 10. The specific surface area of the non-magnetic powder is 1 to 100 m$^2$/g, preferably 5 to 80 m$^2$/g, and more preferably 10 to 70 m$^2$/g. The crystallite size of the non-magnetic powder is preferably 0.004 to 1 μm, and more preferably 0.04 to 0.1 μm. The oil absorption measured using DBP (dibutyl phthalate) is 5 to 100 ml/100 g, preferably 10 to 80 ml/100 g, and more preferably 20 to 60 ml/100 g. The specific gravity is 1 to 12, and preferably 3 to 6. The form may be any one of acicular, spherical, polyhedral, and tabular. The Mohs hardness is preferably in the range of 4 to 10. The amount of SA (stearic acid) absorbed by the non-magnetic powder is 1 to 20 μmol/m$^2$, preferably 2 to 15 μmol/m$^2$, and more preferably 3 to 8 μmol/m$^2$. The surface of the non-magnetic powder is preferably subjected to a surface treatment so that $Al_2O_3$, $SiO_2$, $TiO_2$, $ZrO_2$, $SnO_2$, $Sb_2O_3$, ZnO or $Y_2O_3$ is present. In terms of dispersibility in particular, $Al_2O_3$, $SiO_2$, $TiO_2$, and $ZrO_2$ are preferable, and $Al_2O_3$, $SiO_2$, and $ZrO_2$ are more preferable. They may be used in combination or singly. Depending on the intended purpose, a surface-treated layer may be obtained by co-precipitation, or a method in which alumina is firstly made present and then silica is made present on the surface thereof, or vice versa, can be employed. The surface-treated layer may be formed as a porous layer depending on the intended purpose, but it is generally preferable for it to be uniform and dense.

Specific examples of the non-magnetic powder other than carbon black used in the lower layer of the present invention include Nanotite (manufactured by Showa Denko K.K.), HIT-100 and ZA-G1 (manufactured by Sumitomo Chemical Co., Ltd.), α-hematite DPN-250, DPN-250BX, DPN-245, DPN-270BX, DPN-500BX, DBN-SA1, and DBN-SA3 (manufactured by Toda Kogyo Corp.), titanium oxide TTO-51B, TTO-55A, TTO-55B, TTO-55C, TTO-55S, TTO-55D, SN-100, α-hematite E270, E271, E300, and E303 (manufactured by Ishihara Sangyo Kaisha Ltd.), titanium oxide STT-4D, STT-30D, STT-30, STT-65C, and α-hematite α-40 (manufactured by Titan Kogyo Kabushiki Kaisha), MT-100S, MT-100T, MT-150W, MT-500B, MT-600B, MT-100F, and MT-500HD (manufactured by Tayca Corporation), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and TiO2P25 (manufactured by Nippon Aerosil Co., Ltd.), and 100A, 500A and calcined products thereof (manufactured by Ube Industries, Ltd.). Particularly preferred non-magnetic powders are titanium dioxide and α-iron oxide.

Incorporation of carbon black into the lower layer can give the known effects of a lowering of surface electrical resistance (Rs) and a reduction in light transmittance. Types of carbon black that can be used include furnace black for rubber, thermal black for rubber, black for coloring, and acetylene black. The carbon black used in the lower layer should have characteristics that have been optimized as follows according to a desired effect.

The specific surface area of the carbon black used in the lower layer is generally 100 to 500 m$^2$/g, and preferably 150 to 400 m$^2$/g, and the DBP oil absorption thereof is generally 20 to 400 ml/100 g, and preferably 30 to 400 ml/100 g. The average particle size of the carbon black is generally 5 to 80 nm, preferably 10 to 50 nm, and more preferably 10 to 40 nm. The pH thereof is preferably 2 to 10, the water content thereof is preferably 0.1 to 10 wt %, and the tap density is preferably 0.1 to 1 g/ml. Specific examples of the carbon black used in the present invention include Blackpearls 2000, 1300, 1000, 900, 800, 880 and 700, and Vulcan XC-72 (manufactured by Cabot Corporation), #3050B, #3150B, #3250B, #3750B, #3950B, #950, #650B, #970B, #850B, MA-600, MA-230, #4000 and #4010 (manufactured by Mitsubishi Chemical Corporation), Conductex SC, Raven 8800, 8000, 7000, 5750, 5250, 3500, 2100, 2000, 1800, 1500, 1255 and 1250 (manufactured by Columbia Carbon Co.), and Ketjen Black EC (manufactured by Akzo). The carbon black may be subjected to any of a surface treatment with a dispersant, etc., grafting with a resin, or a partial surface graphitization. The carbon black may also be dispersed in a binder prior to addition to a coating solution. The carbon black can be generally used in a range not exceeding 50 wt % based on the above-mentioned inorganic powder and not exceeding 40 wt % of the total weight of the non-magnetic layer. The carbon black can be used alone or in a combination of different types thereof. The carbon black that can be used in the present invention can be chosen from, for example, those described in the 'Kabon Burakku Binran (Carbon Black Handbook)' (edited by the Carbon Black Association of Japan).

The lower layer can contain also an organic powder according to the intended purpose. Examples of the organic powder include a styrene-acrylic resin powder, a benzoguanamine resin powder, a melamine resin powder, and a phthalocyanine pigment. It is also possible to use a polyolefin resin powder, a polyester resin powder, a polyamide resin powder, a polyimide resin powder, or a polyethylene fluoride resin powder. They can be produced by methods such as those disclosed in JP-A-62-18564 and JP-A-60-255827.

The types and quantities of a binder resin, a lubricant, a dispersant, and an additive used in the lower layer, a solvent, and a dispersion method can be determined according to known techniques relating to the magnetic layers.

(Binder)

A conventionally known thermoplastic resin, thermosetting resin, reactive resin or a mixture thereof is used as a binder in the present invention. The thermoplastic resin has a glass transition temperature of −100° C. to 150° C., a number-average molecular weight of 1,000 to 200,000, and preferably 10,000 to 100,000, and a degree of polymerization of the order of 50 to 1,000.

Examples thereof include polymers and copolymers containing as a repeating unit vinyl chloride, vinyl acetate, vinyl alcohol, maleic acid, acrylic acid, an acrylate ester, vinylidene chloride, acrylonitrile, methacrylic acid, a methacrylate ester, styrene, butadiene, ethylene, vinyl butyral, vinyl acetal and vinyl ether; polyurethane resins; and various types of rubber resins. Examples of the thermosetting resin and the reactive resin include phenol resins, epoxy resins, curable type polyurethane resins, urea resins, melamine resins, alkyd resins, reactive acrylic resins, formaldehyde resins, silicone resins, epoxy-polyamide resins, mixtures of a polyester resin and an isocyanate prepolymer, mixtures of a polyester polyol and a polyisocyanate, and mixtures of a polyurethane and a polyisocyanate. Details of these resins are described in the 'Purasuchikku Handobukku (Plastic Handbook)' published by Asakura Shoten.

It is also possible to use a known electron beam curable type resin in each of the layers. Examples of the resin and a production method therefor are disclosed in detail in JP-A-62-256219. The above-mentioned resins can be used alone or in combination. Combinations of a polyurethane resin with at least one selected from a vinyl chloride resin, a vinyl chloride-vinyl acetate copolymer, a vinyl chloride-vinyl acetate-vinyl alcohol copolymer, and a vinyl chloride-vinyl acetate-maleic anhydride copolymer, and combinations thereof with a polyisocyanate are preferred.

The structure of the polyurethane resin can be a known one such as polyester polyurethane, polyether polyurethane, polyether polyester polyurethane, polycarbonate polyurethane, polyester polycarbonate polyurethane, or polycaprolactone polyurethane. For the purpose of further improving the dispersibility and durability, the above-mentioned binders may preferably be incorporated, if necessary, by copolymerization or by an addition reaction, with at least one polar group selected from —COOM, —SO$_3$M—, OSO$_3$M$_1$—P=O(OM)$_2$, —O—P=O(OM)$_2$ (wherein M represents a hydrogen atom, or an alkali metal salt), —OH, —NR$_2$, —N$^+$R$_3$ (R represents a hydrocarbon group), an epoxy group, —SH, —CN, etc. The polar group content is $10^{-1}$ to $10^{-8}$ mol/g, and preferably from $10^{-2}$ to $10^{-6}$ mol/g.

Specific examples of the binder used in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Corporation), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Denki Kagaku Kogyo Kabushiki Kaisha), MR-104, MR-105, MR-110, MR-100, MR-555 and 400X-110A (manufactured by Zeon Corporation), Nippollan N2301, N2302 and N2304 (manufactured by Nippon Polyurethane Industry Co., Ltd.), Pandex T-5105, T-R3080 and T-5201, Burnock D-400, D-210-80, Crisvon 6109 and 7209 (manufactured by Dainippon Ink and Chemicals, Incorporated), Vylon UR8200, UR8300, UR8700, RV530 and RV280 (manufactured by Toyobo Co., Ltd.), Daiferamine 4020, 5020, 5100, 5300, 9020, 9022 and 7020 (manufactured by Dainichiseika Color & Chemicals Mfg. Co., Ltd.), MX5004 (manufactured by Mitsubishi Chemical Corp.), Sanprene SP-150 (manufactured by Sanyo Chemical Industries, Ltd.), and Saran F310 and F210 (manufactured by Asahi Kasei Corporation).

The amounts of binder used in the lower layer and the magnetic layer according to the present invention are in the range of 5 to 50 wt %, and preferably 10 to 30 wt %, based on the weight of the non-magnetic powder or the magnetic powder. When a vinyl chloride resin is used, the amount thereof is 5 to 30 wt %, when a polyurethane resin is used, the amount thereof is 2 to 20 wt %, the amount of polyisocyanate is 2 to 20 wt %, and they are preferably used in combination, but if, for example, head corrosion is caused by a slight degree of dechlorination, it is possible to use a polyurethane alone or a combination of a polyurethane and an isocyanate alone. When a polyurethane is used in the present invention, the polyurethane has a glass transition temperature of −50° C. to 150° C., and preferably 0° C. to 100° C., an elongation at break of 100% to 2,000%, a breaking stress of 0.5 to 100 MPa (0.05 to 10 kg/mm$^2$), and a yield point of 0.5 to 100 MPa (0.05 to 10 kg/mm$^2$).

The magnetic recording medium in the present invention may comprise two or more layers. Accordingly, the amount of binder, the contents of the vinyl chloride resin, polyurethane resin, polyisocyanate or other resin contained in the binder, the molecular weight of each of the resins forming the magnetic layer, the polar group content, and the above-mentioned physical properties of the resins, etc. can of course be varied in the lower layer and each magnetic layer as necessary, but it is better if these factors are optimized individually for the respective layers, and known techniques relating to multiple magnetic layers can be employed. For example, when the amount of binder is varied among the layers, increasing the amount of binder contained in the magnetic layer is effective in reducing scratches on the surface of the magnetic layer. For the purpose of improving the head contact, the amount of binder in the lower layer can be increased, thereby imparting flexibility.

Examples of the polyisocyanate used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates with a polyalcohol; and polyisocyanates formed by an isocyanate condensation reaction. These isocyanates are commercially available under the trade names of Coronate L, Coronate HL, Coronate 2030, Coronate 2031, Millionate MR and Millionate MTL (manufactured by Nippon Polyurethane Industry Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Urethane Co., Ltd.). These isocyanates may be used in each of the layers, either singly or in combinations of two or more thereof, taking advantage of a difference in curing reactivity.
(Carbon Black, Abrasive)

Examples of the carbon black for use in the magnetic layer according to the present invention include furnace black for rubber, thermal black for rubber, black for coloring, and acetylene black. The carbon black preferably has a specific surface area of 5 to 500 m$^2$/g, a DBP oil absorption of 10 to 400 ml/100 g, an average particle size of 5 to 300 nm, a pH of 2 to 10, a water content of 0.1 to 10 wt %, and a tap density of 0.1 to 1 g/ml. Specific examples of the carbon black used in the present invention include Blackpearls 2000, 1300, 1000, 900, 905, 800, and 700, and Vulcan XC-72 (manufactured by Cabot Corporation), #80, #60, #55, #50, and #35 (manufactured by Asahi Carbon Co., Ltd.), #2400B, #2300, #900, #1000, #30, #40 and #10B (manufactured by Mitsubishi Chemical Corporation), Conductex SC, Raven 150, 50, 40, and 15, and Raven-MT-P (manufactured by Columbia Carbon Co.), and Ketjen Black EC (manufactured by Nippon EC). The carbon black may be subjected to any of a surface treatment with a dispersant, etc., grafting with a resin, or a partial surface graphitization. The carbon black may also be dispersed in a binder prior to addition to a magnetic coating solution. The carbon black may be used alone or in a combination of different types thereof. The carbon black is preferably used in an amount of 0.1 to 30 wt % based on the amount of the magnetic material.

The carbon black has the functions of preventing static charging of the magnetic layer, reducing the coefficient of friction, imparting light-shielding properties, and improving the film strength. Such functions vary depending upon the type of carbon black. Accordingly, it is of course possible in the present invention to appropriately choose the type, the amount and the combination of carbon black for each of the magnetic upper layer and the lower layer according to the intended purpose on the basis of the above mentioned various properties such as the particle size, the oil absorption, the electroconductivity and the pH value, but it is better if they are optimized for the respective layers. Regarding carbon black for use in the magnetic layer of the present invention, for example, those described in the Kabon Burakku Binran (Carbon Black Handbook) (edited by the Carbon Black Association of Japan) can be referred to.

With regard to abrasives used in the magnetic layer according to the present invention, known materials mainly having a Mohs hardness of 6 or above are used alone or in a combination thereof. Examples of the abrasive include α-alumina having an α-component proportion of 90% or above, β-alumina, silicon carbide, chromium oxide, cerium oxide, α-iron oxide, corundum, silicon nitride, silicon carbide, titanium carbide, titanium oxide, silicon dioxide, boron nitride, and diamond. A composite comprising these abrasives (formed by surface-treating an abrasive with another abrasive) may also be used. The abrasive may contain a compound or an element other than the main component in some cases, and the intended effect can be realized as long as the content of the main component is 90 wt % or above. The abrasive preferably has an average particle size of 0.01 to 2 μm and, in particular, for improving the electromagnetic conversion characteristics the abrasive preferably has a narrow particle size distribution. The durability can be improved by combining as necessary a plurality of abrasives having particle sizes that are different from each other, or employing a single abrasive having a wide particle size distribution, thus producing the same effect. The abrasive preferably has a tap density of 0.3 to 2 g/ml, a water content of 0.1 to 5 wt %, a pH of 2 to 11, and a specific surface area of 1 to 30 m$^2$/g. The form of the abrasive used in the present invention may be any of acicular, spherical and cuboidal, but those having a shape that in part includes an edge have high abrasiveness, which is preferable. Specific examples of the abrasive include AKP-12, AKP-15, AKP-20, AKP-30, AKP-50, HIT-20, HIT-30, HIT-55, HIT-60A, HIT-70, HIT-80, and HIT-100 (manufactured by Sumitomo Chemical Co., Ltd.), ERC-DBM, HP-DBM, and HPS-DBM (manufactured by Reynolds Corp.), WA10000 (manufactured by Fujimi Incorporated), UB20 (manufactured by C. Uyemura & CO., Ltd.), G-5, Kromex U2, and Kromex U1 (manufactured by Nippon Chemical Industry Co., Ltd.), TF100 and TF140 (manufactured by Toda Kogyo Corp.), β-Random Ultrafine (manufactured by Ibiden Co., Ltd.), and B-3 (manufactured by Showa Mining Co., Ltd.). These abrasives may be added to the lower layer, if necessary. The addition of an abrasive to the lower layer allows both the surface profile and the protruding state of the abrasive to be controlled. The particle size and the amount of the abrasive that is added to the magnetic layer or the lower layer should be set at optimal values.
(Additive)

As an additive that is used in the magnetic layer and the lower layer according to the present invention, one having a lubricating effect, an antistatic effect, a dispersing effect, a plasticizing effect, etc. may be used. Examples thereof include molybdenum disulfide, tungsten disulfide, graphite, boron nitride, graphite fluoride, a silicone oil, a polar group-containing silicone, a fatty acid-modified silicone, a fluorine-containing silicone, a fluorine-containing alcohol, a fluorine-containing ester, a polyolefin, a polyglycol, an alkyl phosphate and an alkali metal salt thereof, an alkyl sulfate and an alkali metal salt thereof, polyphenyl ether, phenyl phosphonate, α-naphthylphosphoric acid, phenylphosphoric acid, diphenyl phosphate, p-ethylbenzenephosphonic acid, phenyl phosphite, aminoquinones, various types of silane coupling agents and titanium coupling agents, a fluorine-containing alkyl sulfate and an alkali metal salt thereof, a monobasic fatty acid having 10 to 24 carbons (which may contain an unsaturated bond and may be branched) and a metal salt thereof (with Li, Na, K, Cu, etc.), a mono-, di-, tri-, tetra-, penta- or hexa-hydric alcohol having 12 to 22 carbons (which may contain an unsaturated bond and may be branched), an alkoxy alcohol having 12 to 22 carbons (which may contain an unsaturated bond and may be branched), a mono-, di- or tri-fatty acid ester formed from a monobasic fatty acid having 10 to 24 carbons (which may contain an unsaturated bond and may be branched) and any one of mono-, di-, tri-, tetra-, penta- and hexa-hydric alcohols having 2 to 12 carbons (which may contain an unsaturated bond and may be branched), a fatty acid ester of a monoalkyl ether of an alkylene oxide polymer, a fatty acid amide having 8 to 22 carbons, and an aliphatic amine having 8 to 22 carbons.

Specific examples of the fatty acid include capric acid, caprylic acid, lauric acid, myristic acid, palmitic acid, stearic acid, behenic acid, oleic acid, elaidic acid, linolic acid, linolenic acid, and isostearic acid. Examples of the ester include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleate; and examples of the alcohol include oleyl alcohol, stearyl alcohol and lauryl alcohol. Furthermore, examples of other additives that can be used include a nonionic surfactant such as an alkylene oxide type, a glycerol type, a glycidol type, or an alkylphenol-ethylene oxide adduct; a cationic surfactant such as a cyclic amine, an ester amide, a quaternary ammonium salt, a hydantoin derivative, a heterocyclic compound, a phosphonium salt, or a sulfonium salt; an anionic surfactant containing an acidic group such as a carboxylic acid, a sulfonic acid, a phosphoric acid, a sulfate ester group, or a phosphate ester group; and an amphoteric surfactant such as an amino acid, an aminosulfonic acid, a sulfate ester or a phosphate ester of an amino alcohol, or an alkylbetain. Details of these surfactants are described in the 'Kaimenkasseizai Binran (Surfactant Handbook)' (published by Sangyo Tosho Publishing). The lubricant, antistatic agent, etc. need not always be 100% pure and may contain, in addition to the main component, an impurity such as an isomer, an unreacted material, a byproduct, a decomposed product, or an oxide. However, the impurity content is preferably 30 wt % or below, and more preferably 10 wt % or below.

These lubricants and surfactants used in the present invention each have different physical functions. The types, amounts and proportions of a combination generating a synergistic effect thereof should be determined optimally according to the intended purpose. Examples of the synergistic effect include controlling bleeding out of the fatty acids to the surface by using fatty acids having different melting points from each other for the lower layer and the magnetic layer; controlling bleeding out of the esters to the surface by using esters having boiling points, melting points, and polarities that are different from each other; enhancing the coating stability by controlling the amount of surfactant; and enhancing the lubricating effect by increasing the amount of lubricant in the lower layer, but the examples are by no means limited thereto. In general, the total amount of the lubricants is 0.1 to 50 wt %, and preferably from 2 to 25 wt %, based on the weight of the ferromagnetic powder in the magnetic layer or the non-magnetic powder in the lower layer.

All or a part of the additives used in the present invention may be added to a magnetic coating solution or a non-magnetic coating solution at any stage of its preparation. For example, an additive may be blended with a magnetic material before a kneading step; it may be added during the kneading step involving the magnetic material, a binder, and a solvent; it may be added during a dispersing step; it may be added after the dispersing step; or it may be added immediately before coating. Depending on the intended purpose, the purpose might be achieved by coating a part or all of the additives simultaneously with the magnetic layer or in succession after coating the magnetic layer. Depending on the intended purpose, the lubricant may be coated on the surface of a magnetic layer after a calendering treatment (heating and subjecting to pressure by means of calender rolls) or after completion of slitting.

An organic solvent that can be used in the present invention may be any known solvent and, for example, a solvent disclosed in JP-A-6-68453 can be used.

(Layer Construction)

The thickness of the support in the magnetic recording medium of the present invention is 4 to 10 μm, and preferably 7 to 9 μm.

An undercoat layer may be provided between the support and the lower layer for the purpose of improving the adhesion. The thickness of this undercoat layer is generally 0.005 to 0.5 μm, and preferably 0.01 to 0.5 μm.

In the present invention, the lower layer and the magnetic layer are provided on one side of the support, the other side of the support is provided with a back layer, and the thickness of this back layer is generally 0.1 to 1 μm, and preferably 0.3 to 0.7 μm. A known undercoat layer and back layer can be used for this purpose.

The thickness of the magnetic layer of the magnetic recording medium of the present invention can be optimally selected according to the saturation magnetization of the head used, the head gap, and the recording signal zone, and is preferably 0.01 to 0.6 μm, and more preferably 0.05 to 0.3 μm. The magnetic layer may comprise two or more layers each having different magnetic characteristics, and a known multiple magnetic layer structure can be applied to the present invention.

The thickness of the lower layer of the magnetic recording medium according to the present invention is generally 0.2 to 5.0 μm, preferably 0.3 to 3.0 μm, and more preferably 0.5 to 1.5 μm.

(Support)

The support used in the present invention is preferably non-magnetic. As a non-magnetic support, known films can be used. Examples thereof include polyesters such as polyethylene terephthalate and polyethylene naphthalate; polyolefins; cellulose triacetate; polycarbonates; polyamides (including aliphatic polyamides and aromatic polyamides such as aramid); polyimides; polyamideimides; polysulfones; and polybenzoxazole. A high-strength support such as polyethylene naphthalate or a polyamide is preferably used. If necessary, a laminate type support as disclosed in JP-A-3-224127 can be used so as to change the surface roughness of the magnetic layer surface and the base surface. The support may be subjected in advance to a corona discharge treatment, a plasma treatment, an adhesion promotion treatment, a heat treatment, a dust removal treatment, etc.

(Production Method)

The process for producing a magnetic coating solution for a magnetic recording medium of the present invention comprises at least a kneading step, a dispersion step and, optionally, a blending step that is carried out prior to and/or subsequent to the above-mentioned steps. Each of these steps may be composed of two or more separate stages. All materials including the ferromagnetic powder, the binder, the carbon black, the abrasive, the antistatic agent, the lubricant, and the solvent used in the present invention may be added in any step from the beginning or during the course of the step. The addition of each material may be divided across two or more steps. For example, a polyurethane can be divided and added in a kneading step, a dispersing step, and a blending step for adjusting the viscosity after dispersion. To attain the object of the present invention, a conventionally known production technique may be employed as a part of the steps. In the kneading step, it is preferable to use a powerful kneading machine such as an open kneader, a continuous kneader, a pressure kneader or an extruder. When a kneader is used, all or a part of the binder (preferably 30 wt % or above of the entire binder) is kneaded with the magnetic powder or non-magnetic powder in the range of 15 parts to 500 parts by weight of the binder relative to 100 parts by weight of the magnetic powder or non-magnetic powder. Details of this kneading treatment are disclosed in JP-A-1-106338 and JP-A-1-79274. For the dispersion of a magnetic layer solution and a lower layer solution, glass beads can be used, but a dispersing medium having a high specific gravity such as zirconia beads, titania beads, or steel beads is suitably used. An optimal particle size and packing density of these dispersing media should be selected. A known dispersing machine can be used.

A process for preparing a non-magnetic coating solution for the magnetic recording medium of the present invention may include the above-mentioned kneading and dispersing steps, etc. in addition to the essential steps of dispersing the non-magnetic liquid A and the non-magnetic liquid B separately and stirring and mixing the non-magnetic liquid A and the non-magnetic liquid B to prepare a non-magnetic coating solution.

The following methods are preferably used for coating the magnetic recording medium having a multilayer structure of the present invention. As a first method, a lower layer is coated by a gravure coating, roll coating, blade coating, extrusion coating device, etc. that is generally used for a magnetic coating solution, and an upper layer is coated while the lower layer is still in a wet state by means of a pressurized support type extrusion coating device disclosed in JP-B-1-46186, JP-A-60-238179, and JP-A-2-265672. As a second method, an upper layer and a lower layer are coated substantially simultaneously using a coating head equipped with two slits for feeding a coating solution as disclosed in JP-A-63-88080, JP-A-2-17971 and JP-A-2-265672. As a third method, an upper layer and a lower layer are coated substantially simultaneously using an extrusion coating device equipped with a backup roll as disclosed in JP-A-2-174965. In order to prevent degradation of the electromagnetic conversion characteristics, etc. of the magnetic recording medium due to aggregation of magnetic particles, it is desirable to impart shear to the coating solution within the coating head by a method as described in JP-A-62-95174 and JP-A-1-236968. With respect to the viscosity of the coating solutions, it is necessary for it to lie within the range of values disclosed in JP-A-3-8471. In order to realize the constitution of the present invention, a sequential multilayer-coating method in which a magnetic layer is coated on top of a lower layer that has been coated and dried can of course be used without impairing the effect of the present invention. However, in order to reduce coating defects and improve the quality of aspects such as dropouts, it is preferable to use the above-mentioned simultaneous multilayer-coating method, and more preferably a simultaneous dual-coating method.

In the present invention, it is preferable to use a known orientation device involving, for example, applying an alternating magnetic field using a rare-earth type magnet and a solenoid.

The use of heat resistant plastic rolls such as epoxy, polyimide, polyamide or polyimideamide, or metal rolls, is preferred for the calendering treatment. The treatment temperature is preferably 80° C. or above, and more preferably 85° C. to 95° C. The line pressure is preferably 2,000 N/cm (200 kg/cm) or above, and more preferably 3,000 N/cm (300 kg/cm) to 4,500 N/cm (450 kg/cm).

EXAMPLES

The present invention is described in detail below with reference to specific examples, but it should not be construed as being limited thereto. Hereinafter, 'parts' means 'parts by weight'.

Examples 1 to 3

| Non-magnetic layer | |
|---|---|
| a) Non-magnetic liquid A | |
| Non-magnetic powder α-Fe$_2$O$_3$<br>Average major axis length: 0.1 μm<br>Specific surface area by the BET method: 48 m$^2$/g<br>pH: 8.0<br>Fe$_2$O$_3$ content: 90% or more<br>DBP oil absorption: 27 to 38 mL/100 g<br>Surface treatment agent: Al$_2$O$_3$ | 80 parts |
| Vinyl chloride copolymer<br>MR-110 manufactured by Zeon Corporation | 4 parts |
| Polyester polyurethane resin<br>Neopentyl glycol/caprolactone polyol/MDI = 0.9/2.6/1<br>—SO$_3$Na group present at 1 × 10$^{-4}$ eq/g<br>Tg: 65° C. | 4 parts |
| Phenyl phosphonate | 3 parts |
| Butyl stearate | 1 part |
| Stearic acid | 1 part |
| Methyl ethyl ketone | 92 parts |
| Cyclohexanone | 62 part |
| b) Non-magnetic liquid B | |
| Carbon black<br>Average primary particle size: 16 nm<br>DBP oil absorption: 80 mL/100 g<br>pH: 8.0<br>Specific surface area by the BET method: 250 m$^2$/g<br>Volatile content: 1.5% | 20 parts |
| Vinyl chloride copolymer<br>MR-110 manufactured by Zeon Corporation | 4 parts |
| Methyl ethyl ketone | 58 parts |
| Cyclohexanone | 38 parts |

-continued

Magnetic layer a) Magnetic liquid

| | |
|---|---|
| Ferromagnetic metal fine powder | 100 parts |
| Composition: Fe/Co = 70/30 | |
| Hc: 2450 Oe | |
| Specific surface area by the BET method: 43 m$^2$/g | |
| Crystallite size = 160 Å | |
| Surface treatment agent: Al$_2$O$_3$ | |
| Flat acicular particles | |
| Particle size (major axis): 0.125 μm | |
| Longer width (minor axis)/shorter width = 0.025/0.01 | |
| σ$_s$: 157 emu/g | |
| Polyester polyurethane resin | 10 parts |
| Neopentyl glycol/caprolactone polyol/MD I = 0.9/2.6/1 | |
| —SO$_3$Na group present at 1 × 10$^{-4}$ eq/g | |
| Carbon black (particle size: 0.10 μm) | 0.5 parts |
| Methyl ethyl ketone | 90 parts |
| Cyclohexanone | 30 parts |
| Toluene | 60 parts |
| b) Abrasive paste liquid | |
| α-Alumina (particle size: 0.18 μm) | 4.5 parts |
| MR 110 | 0.45 parts |
| Cyclohexanone | 9.2 parts |

Comperative Example 1

| Non-magnetic layer | |
|---|---|
| Non-magnetic powder α-Fe$_2$O$_3$ | 80 parts |
| Average major axis length: 0.1 μm | |
| Specific surface area by the BET method: 48 m$^2$/g | |
| pH: 8.0 | |
| Fe$_2$O$_3$ content: 90% or more | |
| DBP oil absorption: 27 to 38 mL/100 g | |
| Surface treatment agent: Al$_2$O$_3$ | |
| Carbon black | 20 parts |
| Average primary particle size: 16 nm | |
| DBP oil absorption: 80 mL/100 g | |
| pH: 8.0 | |
| Specific surface area by the BET method: 250 m$^2$/g | |
| Volatile content: 1.5% | |
| Vinyl chloride copolymer | 8 parts |
| MR-110 manufactured by Zeon Corporation | |
| Polyester polyurethane resin | 4 parts |
| Neopentyl glycol/caprolactone polyol/MD I = 0.9/2.6/1 | |
| —SO$_3$Na group present at 1 × 10$^{-4}$ eq/g | |
| Tg: 65° C. | |
| Phenyl phosphonate | 3 parts |
| Butyl stearate | 1 part |
| Stearic acid | 1 part |
| Methyl ethyl ketone | 150 parts |
| Cyclohexanone | 100 part |

With regard to the non-magnetic coating solution of the comparative example and the non-magnetic liquid A of the examples, each component, excluding stearic acid and butyl stearate, was kneaded in an open kneader and dispersed in a horizontal sand mill under the above-mentioned conditions. With regard to the non-magnetic liquid B of the example, 10 parts of cyclohexanone was added to the carbon black and the binder, they were kneaded in an open kneader, and diluted to give the above-mentioned amounts of added solvents, and the non-magnetic liquid B was thus prepared. Furthermore, it was dispersed using a horizontal sand mill under the above-mentioned conditions, and then dispersed using a flow type ultrasonic homogenizer. After allowing it to stand for the time described in Table 1, 3 parts of polyisocyanate was added, 1 part each of stearic acid and butyl stearate were added, methyl ethyl ketone and cyclohexanone were further added, and the mixture was mixed in a T. K. Filmics model 80-50 manufactured by Tokushu Kika Kogyo Co., Ltd. at the peripheral speed and for the period of time described in Table 1 to give a non-magnetic coating solution having a solids content of 28% and a solvent ratio of methyl ethyl ketone:cyclohexanone=6:4.

With regard to the magnetic liquid, the magnetic material, polyester polyurethane resin, methyl ethyl ketone, and cyclohexanone of the above-mentioned magnetic liquid a) were kneaded in an open kneader and dispersed in a sand mill with zirconia beads. With regard to the abrasive paste liquid b), an abrasive paste liquid containing alumina: MR 110:cyclohexanone=45:4.5:50.5 was subjected, separately from the magnetic liquid, to a flow type ultrasonic homogenizer (1200 W, frequency: 20 KHz, irradiation area: 50 mmφ, distance between the irradiation area and the holder: 3 mm, amplitude: 30 μm) at a flow rate of 300 g/min for two passes. The magnetic liquid and the abrasive paste liquid were subsequently mixed and stirred, and further mixed and stirred with a solution of 0.5 parts of stearic acid and 1.5 parts of butyl stearate in 50 parts of methyl ethyl ketone and 30 parts of cyclohexanone to give a magnetic coating solution. The magnetic coating solution and the non-magnetic coating solution were prepared by filtering them using a filter having an average pore size of 1 μm.

Simultaneous multilayer coating was carried out on a polyester naphthalate support having a thickness of 5.2 μm and exhibiting a roughness component strength of 0.03 nm$^2$ at a wavelength of 4.3 μm in an AFM roughness spectrum by coating the non-magnetic layer coating solution at a dry thickness of 1.5 μm and, immediately after that, coating the magnetic layer on top thereof at a thickness of 0.2 μm; while both of the layers were still wet, the coatings were subjected to orientation using a cobalt magnet having a magnetic field strength of 3000 G and a solenoid having a magnetic field strength of 1500 G, dried, then subjected to a treatment using a 7 stage calender consisting of metal rolls alone at 85° C., a pressure of 350 kg/cm, and a speed of 50 m/min, and slit into a width of 6.35 mm to give a consumer DVC video tape.

Evaluation Methods (1) Electromagnetic conversion properties: output was measured using a drum tester. A MIG head having a Bs of 1.2 T and a gap of 0.22 μm was used for recording and playback. A signal having a single frequency of 21 MHz was recorded at a head/medium relative speed of 10.5 m/sec during recording/playback, and the playback signal was observed using a spectrum analyzer manufactured by Shibasoku Co., Ltd. The C/N ratio was calculated from the ratios, relative to the carrier signal at 21 MHz, of the points at 20 and 22 MHz, which were 1 MHz away therefrom.

(2) Ra: the centerline average roughness Ra was measured by an optical interference method using a digital optical profiler (manufactured by Wyko Corporation) at a cutoff of 0.25 mm.

(3) Solution viscosity measurement: the low shear solution viscosity was measured using a Vismetron single-cylinder rotational viscometer manufactured by Shibaura Systems Co., Ltd.

(4) Liquid loss: the proportion of the actual liquid amount that was able to be used as a coating solution relative to the theoretical total amount of the non-magnetic liquids was used for evaluation against the following criteria.

A: 80% or more, B: 70% or more, C: less than 70%.

TABLE 1

|  | Example 1 | Example 2 | Example 3 | Comparative Example 1 |
|---|---|---|---|---|
| Dispersion method | Separate | Separate | Separate | Simultaneous |
| Non-magnetic liquid disperser | Horizontal sand mill | Horizontal sand mill | Horizontal sand mill | Horizontal sand mill |
| Carbon paste liquid disperser | Horizontal sand mill + ultrasonic homogenizer | Horizontal sand mill + ultrasonic homogenizer | Horizontal sand mill | — |
| Dispersing media | Zirconia $ZrO_2$ | Zirconia $ZrO_2$ | Zirconia $ZrO_2$ | Zirconia $ZrO_2$ |
| Media particle size | 0.5 mmφ | 0.5 mmφ | 0.5 mmφ | 0.5 mmφ |
| Proportion by volume of media in disperser for non-magnetic liquid % | 80 | 80 | 80 | 80 |
| Dispersion time (min) for non-magnetic liquid (carbonless non-magnetic liquid for separate dispersion) | 30 | 30 | 30 | 30 |
| Dispersion process for carbon black paste (residence time) | Sand mill: 60 min + ultrasonic | Sand mill: 60 min + ultrasonic | Sand mill | (Sand mill) |
| Concentration of carbon black paste liquid | 20% | 20% | 20% | — |
| Time for allowing paste liquid to stand after separate dispersion | 24 hr | 24 hr | 24 hr | (24 hr) |
| Re-dispersion of separately dispersed paste liquid | None | None | None | 15 min |
| Method of mixing non-magnetic liquid/carbon black paste liquid | Filmics, peripheral speed: 25 m/s, 1 min | Filmics, peripheral speed: 50 m/s, 1 min | Filmics, peripheral speed: 50 m/s, 1 min | Homo Disper, peripheral speed: 18 m/s, 30 min |
| Liquid aging from mixing to coating | 1 min | 1 min | 1 min | 1 min |
| Layer structure | Multilayer | Multilayer | Multilayer | Multilayer |
| Magnetic layer thickness/non-magnetic layer thickness μm | 0.2/1.5 | 0.2/1.5 | 0.2/1.5 | 0.2/1.5 |
| Surface properties of magnetic layer: Ra nm | 1.6 | 1.5 | 1.6 | 1.8 |
| C/N: dB | 1.9 | 2.1 | 2 | 0 |
| Viscosity of dispersed non-magnetic liquid A: PS | 40 | 40 | 40 | 280 |
| Viscosity of non-magnetic liquid A immediately prior to mixing: PS | 48 | 48 | 48 | 285 (after re-dispersion) |
| Viscosity of dispersed non-magnetic liquid B: PS | 60 | 60 | 180 | 280 |
| Viscosity of non-magnetic liquid B immediately prior to mixing: PS | 160 | 160 | Gelled (300 PS or more) | 285 |
| Liquid loss of non-magnetic liquid | A | A | A | C |

Comparative Example 1 is a case in which α-iron oxide as the main powder and carbon black were simultaneously kneaded and dispersed for a long period of time using zirconia beads. The time taken after completing dispersion of the non-magnetic liquid and before re-dispersion was 24 hours.

Examples 1 to 3 are cases in which α-iron oxide as the main powder and carbon black as the secondary powder were dispersed separately, the non-magnetic liquid B comprising the carbon black and the non-magnetic liquid A comprising the main powder α-iron oxide and a binder were allowed to stand for 24 hours, a curing agent, a lubricant, and a solvent were subsequently added, and mixing and stirring was carried out using a Filmics at a peripheral speed of 25 m/s or more.

In Examples 1 to 3, compared with Comparative Example 1, the solution viscosity after completion of dispersion could be suppressed, and not only could the liquid loss be reduced, but also, even when the solutions were allowed to stand after completion of dispersion up to preparation of a coating solution, the surface was smooth, thus improving the electromagnetic conversion properties.

In Example 2, in comparison with Example 1, the peripheral speed was increased to 50 m/s, and in Example 3, in comparison with Example 2, the non-magnetic liquid B comprising the carbon black was dispersed by a sand mill alone.

In Example 3, in comparison with Example 2, the solution viscosity of the dispersed non-magnetic liquid B comprising the carbon black increased and the solution gelled when it was allowed to stand for 24 hours, but high speed mixing and stirring using a Filmics could achieve surface smoothing and give the same electromagnetic conversion characteristics as in Example 2.

What is claimed is:

1. A process for producing a magnetic recording medium comprising a non-magnetic flexible support, a non-magnetic layer comprising a non-magnetic powder and a binder, and a magnetic layer comprising a ferromagnetic powder and a binder, the non-magnetic layer being provided on top of the support, the magnetic layer being provided on top of the non-magnetic layer, and the non-magnetic powder comprising two or more types of non-magnetic powder including carbon black and a non-magnetic powder other than carbon black, the process comprising:

a step of separately dispersing a non-magnetic liquid A and a non-magnetic liquid B, the non-magnetic liquid A comprising a binder and a non-magnetic powder other than carbon black and the non-magnetic liquid B comprising carbon black and a binder;

a step of stirring and mixing the non-magnetic liquid A and the non-magnetic liquid B to prepare a non-magnetic coating solution;

providing said non-magnetic coating solution on top of said non-magnetic flexible support to obtain said non-magnetic layer; and providing said magnetic layer on top of said non-magnetic layer.

2. The process according to claim 1 wherein the stirring and mixing employs a thin-film spin system high speed mixer.

3. The process according to claim 1 wherein the stirring and mixing is carried out at a peripheral speed of 25 m/sec or higher.

4. The process according to claim 1 wherein the dispersing of the non-magnetic liquid B employs sand-mill dispersion and ultrasonic dispersion in combination.

5. The process according to claim 1 wherein the dispersing of the non-magnetic liquid A employs a sand mill.

6. The process according to claim 1 wherein the non-magnetic powder other than carbon black is selected from the group consisting of a metal oxide, a metal carbonate, a metal sulfate, a metal nitride, a metal carbide, and a metal sulfide.

7. The process according to claim 1 wherein the non-magnetic powder other than carbon black is selected from the group consisting of titanium dioxide, zinc oxide, α-iron oxide, and barium sulfate.

8. The process according to claim 1 wherein the stirring and mixing is a batchwise treatment.

9. The process according to claim 1 wherein the stirring and mixing is a continuous treatment.

10. The process according to claim 1 wherein the stirring and mixing includes holding for a period of 0 to 30 sec after the peripheral speed reaches a constant speed.

11. The process according to claim 1 wherein the carbon black is used in a range not exceeding 50 wt % relative to the non-magnetic powder other than carbon black.

12. The process according to claim 1 wherein the carbon black is used in a range not exceeding 40 wt % of the total weight of the non-magnetic layer.

13. The process according to claim 1 wherein the non-magnetic powder other than carbon black has an average particle size of 0.01 to 0.2 μm.

14. The process according to claim 1 wherein the non-magnetic powder other than carbon black comprises particles having an average major axis length of 0.01 to 0.2 μm.

15. The process according to claim 1 wherein the carbon black has a specific surface area of 100 to 500 $m^2$/g.

16. The process according to claim 1 wherein the carbon black has a DBP oil absorption of 20 to 400 mL/100 g.

17. The process according to claim 1 wherein the carbon black has an average particle size of 5 to 80 nm.

18. The process according to claim 1 wherein the binder used in the non-magnetic coating solution is used in the range of 5 to 50 wt % relative to the non-magnetic powder.

19. The process according to claim 1 wherein the ferromagnetic powder is a ferromagnetic metal powder.

20. The process according to claim 1 wherein the non-magnetic flexible support is polyethylene naphthalate or polyamide.

* * * * *